United States Patent [19]
Takahashi et al.

[11] Patent Number: 5,472,283
[45] Date of Patent: Dec. 5, 1995

[54] CYLINDRICAL DYNAMIC PRESSURE BEARING FORMED OF POLYPHENYLENE SULFIDE RESIN INCLUDING GLASS FIBERS

[75] Inventors: Takeshi Takahashi, Yamatotakada; Masayoshi Onishi, Tondabayashi, both of Japan

[73] Assignee: Koyo Seiko Co., Ltd., Osaka, Japan

[21] Appl. No.: 345,399

[22] Filed: Nov. 21, 1994

[30] Foreign Application Priority Data

Dec. 27, 1993 [JP] Japan .................... 5-333136

[51] Int. Cl.⁶ .................................... F16C 32/06
[52] U.S. Cl. .................................... 384/100; 384/114
[58] Field of Search .................... 384/100, 107, 384/111, 112, 114, 115, 117, 118, 119, 120, 907, 908, 909

[56] References Cited

U.S. PATENT DOCUMENTS

| | | | |
|---|---|---|---|
| 3,467,449 | 9/1969 | Muijderman | 384/110 |
| 4,774,749 | 10/1988 | Furumura | 384/907 |
| 4,798,480 | 1/1989 | Van Beek | 384/114 |
| 4,934,836 | 6/1990 | Tanaka et al. | 384/107 X |
| 5,054,938 | 10/1991 | Ide | 384/117 |
| 5,066,144 | 11/1991 | Ide | 384/117 |
| 5,114,245 | 5/1992 | Tanaka et al. | 384/107 X |
| 5,356,226 | 10/1994 | Onishi et al. | 384/119 |

*Primary Examiner*—Thomas R. Hannon
*Attorney, Agent, or Firm*—Wenderoth, Lind & Ponack

[57] ABSTRACT

A dynamic pressure bearing has a cylindrical configuration and includes dynamic pressure generating grooves on its inner peripheral surface. The bearing which is injection-molded is made of a material consisting principally of a polyphenylene sulfide resin including glass fibers. Furthermore, the bearing has an outside diameter R and an inside diameter r set such that a ratio R/r of the outside diameter R to the inside diameter r falls within a range of $1.2 \leq R/r \leq 2.5$. The bearing also has an axial length L satisfying $L \leq 3r$.

3 Claims, 3 Drawing Sheets

Gate side

Gate side

| | Roundness | Cylindricity |
|---|---|---|
| Invention (PPS+30%GF, $1.25 \leq R/r \leq 2.5$, $L/r \leq 3.0$) | 3 μm or less | 3 μm or less |
| Non-invention (Other materials, $1.25 \leq R/r \leq 2.5$, $L/r \leq 3.0$) | 10 μm or more | 10 μm or more |

5,472,283

CYLINDRICAL DYNAMIC PRESSURE BEARING FORMED OF POLYPHENYLENE SULFIDE RESIN INCLUDING GLASS FIBERS

BACKGROUND OF THE INVENTION

1. Field of the Invention

The present invention relates to a cylindrical dynamic pressure bearing having grooves for generating dynamic pressure on an inner peripheral surface thereof and particularly to a dynamic pressure bearing which is formed by the injection molding process.

2. Description of the Prior Art

Conventionally, as a dynamic pressure bearing of the above-mentioned type, there has been a dynamic pressure bearing which is made of a plastic material and formed by the insert molding method using a shaft as a male insert.

In order to mold a plastic material with accuracy by the insert molding method, it is important for the plastic material to have a good flowability and small shrink characteristics. The good flowability of plastics is an important factor in forming shallow dynamic pressure generating grooves of a depth of several micrometers with dimensional accuracy in a cylindrical dynamic pressure bearing, while the small shrink properties are an important factor in achieving a good cylindricity of the inside diameter of the cylindrical dynamic pressure bearing.

Unfortunately, it has been difficult to achieve a dimensional accuracy required for the dynamic pressure bearing no matter how the molding conditions are set.

In a dynamic pressure bearing formed of a plastic material such as polyamide or polyacetal having a good flowability and yet great shrink properties, a significant warpage occurs in the inner peripheral surface of the bearing. As a result, the bearing will not have a good cylindricity. FIG. 1 shows the warpage W of the inner peripheral surface.

FIG. 2 and 3 respectively show inner peripheral configurations of injection-molded dynamic pressure bearings formed of a plastic material such as PC (polycarbonate) or LCP (liquid Crystal polymer). Because such plastics have small shrink properties and yet an inferior flowability, the following phenomenon occurs. That is, as the grooves are farther from a gate of the injection mold, the grooves become shallower, as shown in FIG. 2. Otherwise, as the groove are farther from the gate, the inside diameter becomes smaller, as shown in FIG. 3. The cylindricity thus deteriorates.

SUMMARY OF THE INVENTION

The object of the present invention is therefore to provide a dynamic pressure bearing capable of being formed of a resin by the injection molding process and allowing its inner surface including dynamic pressure generating grooves to be formed with high accuracy.

In order to accomplish the above object, the present invention provides an improvement on a dynamic pressure bearing having a cylindrical configuration and including dynamic pressure generating grooves on an inner peripheral surface thereof. According to the present invention, the dynamic pressure bearing is made of a material consisting principally of a polyphenylene sulfide resin including glass fibers. Furthermore, the dynamic pressure bearing has an outside diameter R and an inside diameter r set such that a ratio R/r of the outside diameter R to the inside diameter r falls within a range of $1.2 \leq R/r \leq 2.5$, and also has an axial length L satisfying $L \leq 3r$.

FIG. 4 shows the cylindricity and the roundness of injection-molded cylindrical dynamic pressure bearings formed of a molding material consisting principally of the polyphenylene sulfide resin including glass fibers.

In FIG. 4, a circular mark o indicates measurement results of the cylindricity and the roundness using the ratio R/r of the outside diameter R to the inside diameter r as a parameter. As is apparent from a line K1 connecting the circular marks, the cylindricity and the roundness can be made to be 3 μm or less when the R/r ratio falls within the range of $1.2 \leq R/r \leq 2.5$. In contrast to this, when the R/r ratio is smaller than 1.2 or when the R/r ratio is greater than 2.5, the cylindricity and the roundness are suddenly degraded to reach to a few times 3 μm.

Meanwhile, a triangular mark Δ in FIG. 4 indicates measurement results of the cylindricity and the roundness using a ratio L/r of the axial length L to the inside diameter r as a parameter. As is apparent from a line K2 connecting the triangular marks, the cylindricity and the roundness are 3 μm or less when the L/r ratio is 3.0 or less, i.e., when the axial length L assumes a value satisfying $L \leq 3r$. In contrast to this, when the L/r ratio is greater than 3.0, the cylindricity and the roundness are suddenly degraded to reach to a few times 3 μm.

In other words, by injection molding a dynamic pressure bearing using the polyphenylene sulfide resin including glass fibers as a molding material, setting the ration R/r of the outside diameter R to the inside diameter r within a range of $1.2 \leq R/r \leq 2.5$, and making the axial length L satisfy $L \leq 3r$, the cylindricity and the roundness can be made to be 3 μm or less. Accordingly the present invention assures a dimensional accuracy required for the inner surface and the dynamic pressure generating grooves of the dynamic pressure bearing.

It is to be noted that in injection-molded dynamic pressure bearings formed of other molding materials than the polyphenylene sulfide containing glass fibers, the cylindricity and the roundness become 10 μm or more even when the inside diameter r, the outside diameter R, and the axial length L are set within the above-mentioned ranges, as described later.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The following describes in more detail the present invention with reference to the attached drawings.

Figures 5, 6:
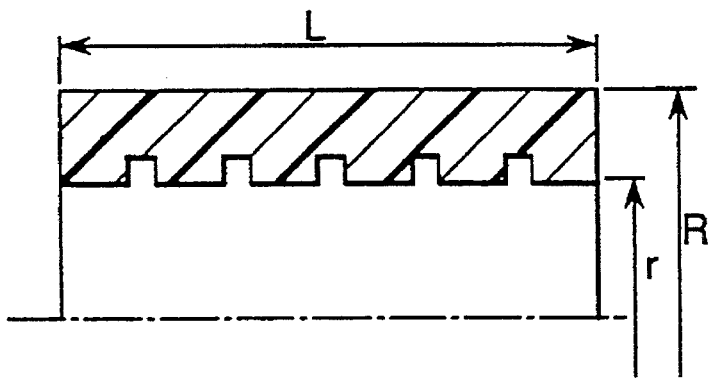
FIG. 5 is an illustration showing the axial length L, the inside diameter r, and the outside diameter R of the dynamic pressure bearing.
FIG. 6 is a chart of comparison between the cylindricity and roundness of the dynamic pressure bearing of the present invention and the cylindricity and roundness of non-invention examples.

A dynamic pressure bearing in accordance with an embodiment of the present invention has a cylindrical configuration as shown in FIG. 5, and is formed of a polyphenylene sulfide (PPS) resin including glass fibers at preferably approximately 30 wt %. The dynamic pressure bearing is injection-molded. In regard to the dimensions shown in FIG. 5, the present embodiment has an inside diameter r of 3.0 mm, an outside diameter R of 6.0 mm, and an axial length L of 7.2 mm. Therefore, the ratio R/r of the outside diameter R to the inside diameter r is 2.0, which value falls within the range of $1.2 \leq R/r \leq 2.5$. Meanwhile, a ratio L/r of the axial length L to the inside diameter r is 2.4, which value is not greater than 3.

Figure 1:
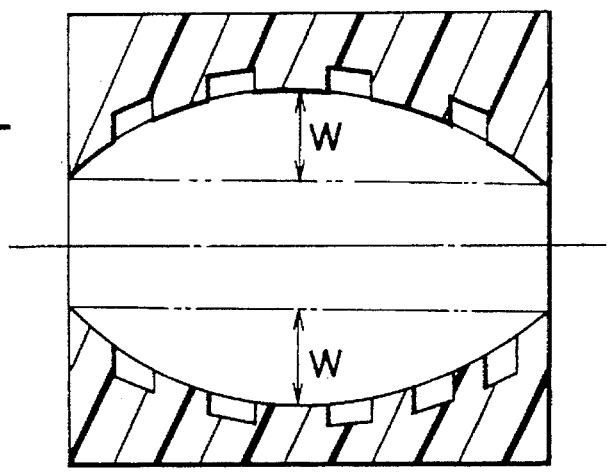
FIG. 1 is a sectional view of a conventional injection-molded dynamic pressure bearing formed of polyacetal, showing a configuration of the inner peripheral surface of the bearing.
Figure 2:
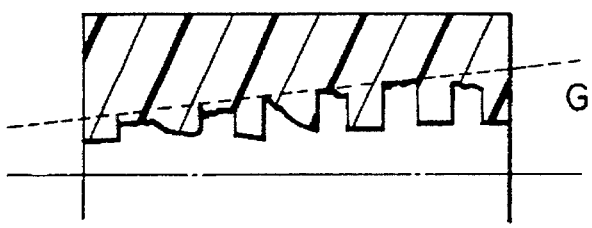
FIG. 2 is a sectional view of a conventional injection-molded dynamic pressure bearing formed of PC or LCP, showing the inner peripheral surface of the bearing.
Figure 3:
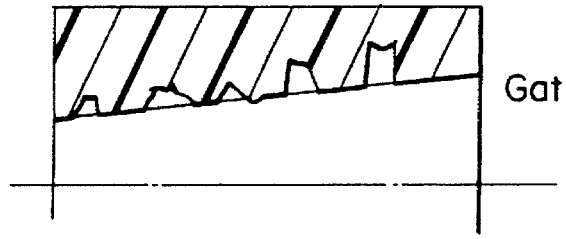
FIG. 3 is a sectional view of a conventional injection-molded dynamic pressure bearing formed of PC or LCP, showing the inner peripheral surface of the bearing.
Figure 4:
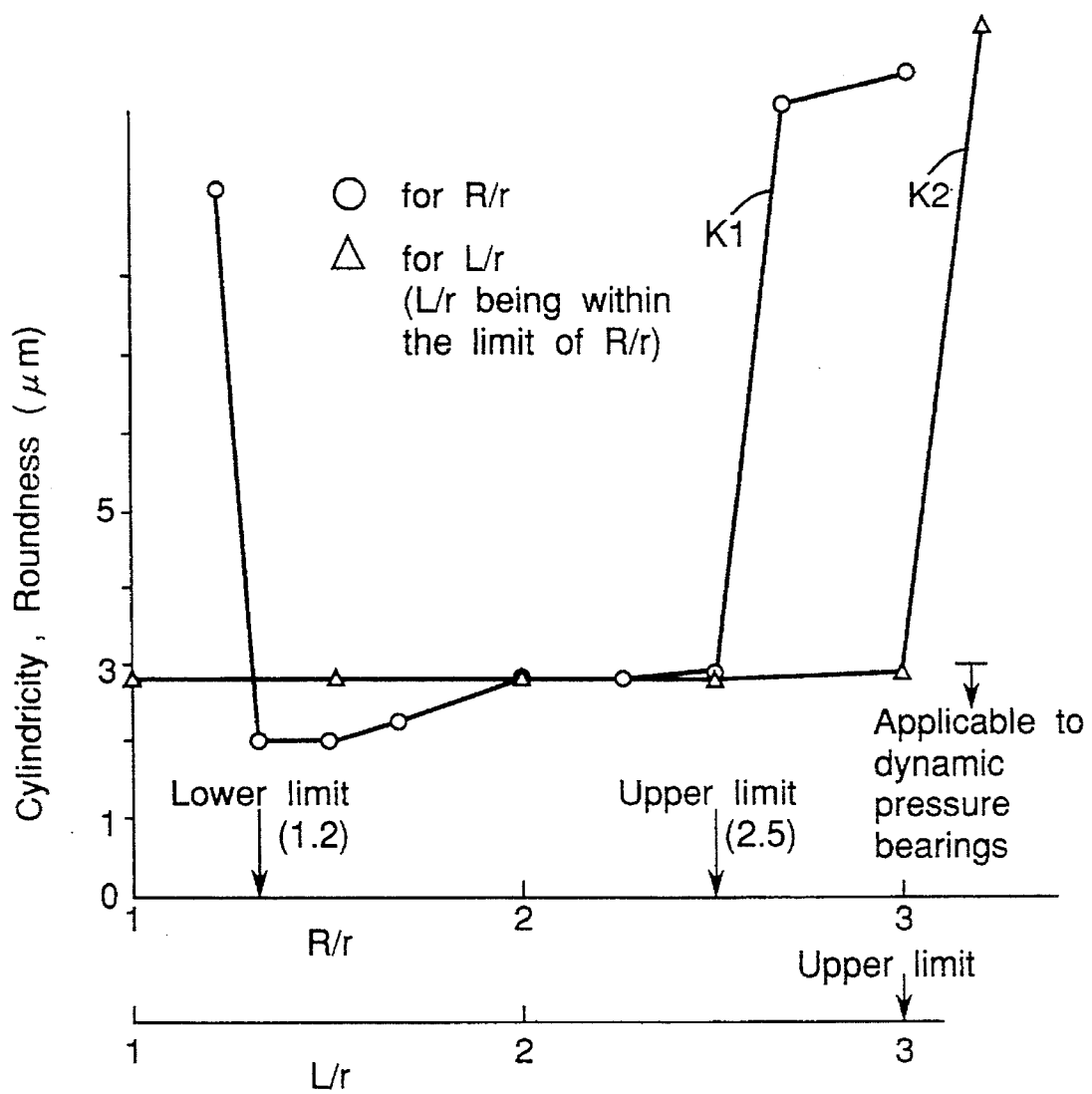
FIG. 4 is a characteristic diagram showing a relationship between dimensional parameters R/r and L/r and the cylindricity and the roundness of injection-molded dynamic pressure bearings formed of a molding material consisting principally of the polyphenylene sulfide resin including glass fibers.

Since the present embodiment bearing is formed of the polyphenylene sulfide resin including approximately 30 wt % of glass fibers by the injection molding process, the cylindricity and roundness characteristics shown in FIG. 4 apply to the present embodiment. Because in the present embodiment, the ratio R/r of the outside diameter R to the inside diameter r is 2.0 and the ratio L/r of the axial length L to the inside diameter r is 2.4, the cylindricity and the roundness of the present example are about 2.8 μm being smaller than 3 μm, as obvious from the characteristics curve K1 for the parameter of the R/r ratio and the characteristics curve K2 for the parameter of the L/r ratio.

Therefore, the injection-molded-dynamic pressure bearing of the present embodiment has a sufficient dimensional accuracy required for the inner peripheral surface and the dynamic pressure generating grooves.

In contrast, in injection-molded dynamic pressure bearings formed of other materials than the polyphenylene sulfide resin including glass fibers, the cylindricity and the roundness become 10 μm or more even when the inside diameter r, the outside diameter R, and the length L are set within the above-mentioned ranges, as shown in FIG. 6. This proves that unless the polyphenylene sulfide resin including glass fibers is used as the molding material, the dimensional accuracy required for the inner surface and the dynamic pressure generating grooves of the dynamic pressure bearing cannot be assured.

Furthermore, since the present embodiment is made of a resin, it is possible to avoid possible impact and damage caused by a shaft put into contact with the bearing at the start-up and the stop of the operation and thereby suppress the deterioration of the bearing performance to the minimum even when an instantaneous shortage of lubricant occurs.

Furthermore, since the present embodiment is made of a resin, a cost reduction is achieved in comparison with bearings made of a metal or ceramic.

The ratio R/r of the outside diameter R to the inside diameter r is set at 2.0 and the ratio L/r of the axial length L to the inside diameter r is set at 2.4 in the aforementioned embodiment. However, so long as the R/r ratio is between 1.2 and 2.5 and the L/r ratio is not greater than 3.0, the cylindricity and the roundness will be 3 μm or less and the dimensional accuracy required for the dynamic pressure-bearing is thus assured.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dynamic pressure bearing having a cylindrical configuration and including dynamic pressure generating grooves on an inner peripheral surface thereof, wherein said dynamic pressure bearing is made of a material consisting principally of a polyphenylene sulfide resin including glass fibers and wherein said dynamic pressure bearing has an outside diameter R and an inside diameter r set such that a ratio R/r of the outside diameter R to the inside diameter r falls within a range of $1.2 \leq R/r \leq 2.5$, and also has an axial length L satisfying $L \leq 3r$.

2. The dynamic pressure bearing as claimed in claim 1, which is injection-molded.

3. The dynamic pressure bearing as claimed in claim 1, wherein said glass fibers are included in the polyphenylene sulfide resin at substantially 30 wt %.

\* \* \* \* \*